(12) United States Patent
Nagamine et al.

(10) Patent No.: US 10,044,782 B2
(45) Date of Patent: Aug. 7, 2018

(54) TERMINAL DEVICE, DATA TRANSMISSION METHOD, AND COMPUTER-READABLE RECORDING MEDIUM

(71) Applicants: Shoh Nagamine, Kanagawa (JP); Takuya Imai, Tokyo (JP); Kenichiro Morita, Tokyo (JP)

(72) Inventors: Shoh Nagamine, Kanagawa (JP); Takuya Imai, Tokyo (JP); Kenichiro Morita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 288 days.

(21) Appl. No.: 14/851,411

(22) Filed: Sep. 11, 2015

(65) Prior Publication Data

US 2016/0080449 A1   Mar. 17, 2016

(30) Foreign Application Priority Data

Sep. 16, 2014 (JP) .................................. 2014-188188

(51) Int. Cl.
| | | |
|---|---|---|
| G06F 15/16 | (2006.01) | |
| H04L 29/06 | (2006.01) | |
| H04N 7/15 | (2006.01) | |
| H04L 12/18 | (2006.01) | |

(Continued)

(52) U.S. Cl.
CPC ........ *H04L 65/602* (2013.01); *H04L 12/1813* (2013.01); *H04L 12/1827* (2013.01); *H04L 65/60* (2013.01); *H04M 3/567* (2013.01); *H04N 7/147* (2013.01); *H04N 7/15* (2013.01)

(58) Field of Classification Search
USPC ................... 709/219, 233; 455/410; 707/758
See application file for complete search history.

(56) References Cited

U.S. PATENT DOCUMENTS

| 7,529,270 B2 | 5/2009 | Uramatsu et al. | |
| 2003/0037160 A1* | 2/2003 | Wall ..................... | H04L 12/1836 709/233 |

(Continued)

FOREIGN PATENT DOCUMENTS

| JP | 3852752 | 9/2006 |
| JP | 2011-041153 | 2/2011 |
| JP | 2016-5139 A | 1/2016 |

*Primary Examiner* — Tammy Nguyen
(74) *Attorney, Agent, or Firm* — Oblon, McClelland, Maier & Neustadt, L.L.P.

(57) ABSTRACT

A terminal includes: a receiving unit receiving document data from an external device; an acquiring unit acquiring the network bandwidth that is available to transmit data; an assigning unit assigning, in accordance with the network bandwidth that is available to transmit data, a transmission rate to each set of data that is to be transmitted to a different terminal device; a determining unit determining, according to the transmission rate that is assigned to the document data, the quality of the document data that is transmitted from the terminal device to a different terminal device; a converting unit converting the quality of the document data that is input from the external device such that equal to or less than the determined quality is obtained; and an encoding unit encoding multiple sets of data that include the converted document data by using the transmission rate that is assigned to each of them.

13 Claims, 16 Drawing Sheets

(51) Int. Cl.
*H04M 3/56* (2006.01)
*H04N 7/14* (2006.01)

(56) References Cited

U.S. PATENT DOCUMENTS

| | | | |
|---|---|---|---|
| 2014/0105447 A1* | 4/2014 | Samari | G06F 17/30743 382/100 |
| 2014/0106708 A1* | 4/2014 | Samari | G06Q 30/0241 455/410 |
| 2014/0108441 A1* | 4/2014 | Samari | G06F 17/30551 707/758 |
| 2014/0118475 A1 | 5/2014 | Nagamine et al. | |
| 2014/0240450 A1 | 8/2014 | Morita et al. | |
| 2014/0244460 A1 | 8/2014 | Imai et al. | |
| 2014/0362718 A1 | 12/2014 | Nagamine et al. | |
| 2014/0368410 A1 | 12/2014 | Imai et al. | |
| 2015/0365727 A1* | 12/2015 | Nagamine | H04N 21/4621 725/62 |
| 2016/0080449 A1* | 3/2016 | Nagamine | H04L 65/602 709/219 |

* cited by examiner

ACTUAL COMMUNICATION RESULT

| | VIDEO DATA | AUDIO DATA | DOCUMENT DATA | TOTAL |
|---|---|---|---|---|
| TRANSMITTING SIDE | 300 kbps | 72 kbps | 0 kbps | 372 kbps |
| RECEIVING SIDE | 1200 kbps | 72 kbps | 0 kbps | 1272 kbps |

RATE ASSIGNMENT

| | VIDEO DATA | AUDIO DATA | DOCUMENT DATA |
|---|---|---|---|
| TRANSMISSION RATE | 150 kbps | 72 kbps | 150 kbps |

FIG.11

| RATE RANGE | QUALITY | | |
|---|---|---|---|
| | RESOLUTION | FRAME RATE | COLOR DEPTH |
| EQUAL TO OR GREATER THAN 1000 kbps | 1280 × 720 | 5 fps | 32 BITS |
| EQUAL TO OR GREATER THAN 500 kbps AND LESS THAN 1000 kbps | 800 × 540 | 3 fps | 32 BITS |
| EQUAL TO OR GREATER THAN 300 kbps AND LESS THAN 500 kbps | 640 × 360 | 1 fps | 16 BITS |
| LESS THAN 300 kbps | 320 × 180 | 1 fps | 8 BITS |

FIG.17

| CONTENTS | RATE RANGE | QUALITY | | |
|---|---|---|---|---|
| | | RESOLUTION | FRAME RATE | COLOR DEPTH |
| MOVING IMAGE CHARACTER IS PRESENT | EQUAL TO OR GREATER THAN 1000 kbps | 1280 × 720 | 30 fps | 32 BITS |
| | EQUAL TO OR GREATER THAN 500 kbps AND LESS THAN 1000 kbps | 800 × 540 | 10 fps | 32 BITS |
| | EQUAL TO OR GREATER THAN 300 kbps AND LESS THAN 500 kbps | 640 × 360 | 5 fps | 16 BITS |
| | LESS THAN 300 kbps | 640 × 360 | 1 fps | 8 BITS |
| MOVING IMAGE CHARACTER IS ABSENT | EQUAL TO OR GREATER THAN 1000 kbps | 1280 × 720 | 30 fps | 32 BITS |
| | EQUAL TO OR GREATER THAN 500 kbps AND LESS THAN 1000 kbps | 640 × 360 | 15 fps | 32 BITS |
| | EQUAL TO OR GREATER THAN 300 kbps AND LESS THAN 500 kbps | 640 × 360 | 5 fps | 16 BITS |
| | LESS THAN 300 kbps | 320 × 180 | 5 fps | 8 BITS |
| STILL IMAGE CHARACTER IS PRESENT | EQUAL TO OR GREATER THAN 1000 kbps | 1280 × 720 | 5 fps | 32 BITS |
| | EQUAL TO OR GREATER THAN 500 kbps AND LESS THAN 1000 kbps | 960 × 540 | 5 fps | 32 BITS |
| | EQUAL TO OR GREATER THAN 300 kbps AND LESS THAN 500 kbps | 800 × 450 | 5 fps | 16 BITS |
| | LESS THAN 300 kbps | 800 × 450 | 0.5 fps | 8 BITS |
| STILL IMAGE CHARACTER IS ABSENT | EQUAL TO OR GREATER THAN 1000 kbps | 1280 × 720 | 5 fps | 32 BITS |
| | EQUAL TO OR GREATER THAN 500 kbps AND LESS THAN 1000 kbps | 960 × 540 | 5 fps | 32 BITS |
| | EQUAL TO OR GREATER THAN 300 kbps AND LESS THAN 500 kbps | 640 × 360 | 5 fps | 16 BITS |
| | LESS THAN 300 kbps | 640 × 360 | 1 fps | 8 BITS |

TERMINAL DEVICE, DATA TRANSMISSION METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2014-188188 filed in Japan on Sep. 16, 2014.

BACKGROUND OF THE INVENTION

1. Field of the Invention

The present invention relates to a terminal device, a data transmission method, and a computer-readable recording medium.

2. Description of the Related Art

Conference systems for conducting remote conferences with remote locations via the Internet, or the like, have become widely used. With the conference system, in a conference room where there is one of the participants to conduct a remote conference, the image and the voice of the participant are collected by using a terminal device, and the digital data is transmitted to a terminal device in a conference room where there is the other of the participants. Then, the terminal device in the conference room, in which there is the other of the participants, presents images on a display and outputs sounds by using a speaker, whereby a communication is established.

Furthermore, in recent years, with the above-described conference system, document data that is generated by a document preparation program, a spreadsheet program, a presentation program, a drawing generation program, a photo editing program, or the like, has been often shared by terminal devices.

Furthermore, document data usually contains a large amount of data. Therefore, in the conference system, sharing of document data causes the occurrence of a delay of video data and audio data, a loss of packets, or the like, which results in a lack of information. Hence, in this type of conference system, a bandwidth is previously assigned to each of video data, audio data, and document data in accordance with the available network bandwidth so that information is prevented from being lacked with regard to all of the video data, the audio data, and the document data. Furthermore, in the conference system, the video data, the audio data, and the document data are transmitted and received within the range that is assigned to each of them. Thus, in the conference system, regardless of the data amount of document data, it is possible to transmit and receive video data and audio data without fail.

However, in conventional conference systems, even if a narrow network bandwidth is available to a terminal device on the transmitting side, a bandwidth is assigned to each of the video data, the audio data, and the document data in order of priority that is previously defined. Thus, as a result of assignment of the bandwidth, the bandwidth is sometimes not sufficient to transmit document data. In such a case, however, the terminal device needs to perform an operation to transmit the document data in accordance with the assigned bandwidth. Therefore, in some cases, the terminal device compresses the document data at a too high compression rate or extremely decreases the resolution or the frame rate. In this case, there is a possibility that the terminal device extremely encodes document data such that, when the document data is decoded by the receiving side, the contents of information cannot be understood.

In view of the above-described conventional problem, there is a need to prevent extreme encoding such that, when document data is decoded by the receiving side, the contents of information cannot be understood.

SUMMARY OF THE INVENTION

It is an object of the present invention to at least partially solve the problems in the conventional technology.

According to the present invention, there is provided a terminal device in a transmission system where, to cause multiple users who use terminal devices to perform a communication, multiple sets of data are encoded, transmitted, and received via a network between the terminal devices, the terminal device comprising: a data receiving unit that receives document data from an external device; a network-information acquiring unit that acquires a network bandwidth that is available to transmit data; an assigning unit that assigns a transmission rate to each set of data that is to be transmitted to a different terminal device in accordance with the network bandwidth that is available to transmit data; a quality determining unit that determines a quality of the document data that is transmitted from the terminal device to a different terminal device in accordance with a transmission rate that is assigned to the document data; a quality converting unit that converts a quality of the document data that is input from the external device such that equal to or less than the determined quality is obtained; an encoding unit that encodes multiple sets of data that include the converted document data by using transmission rates that are assigned to the sets of data; and a transmitting unit that transmits multiple sets of encoded data to a different terminal device.

The present invention also provides a data transmission method that is implemented by a terminal device in a transmission system where, to cause multiple users who use terminal devices to perform a communication, multiple sets of data are encoded, transmitted, and received via a network between the terminal devices, the data transmission method comprising: receiving document data from an external device; acquiring a network bandwidth that is available to transmit data; assigning a transmission rate to each set of data that is to be transmitted to a different terminal device in accordance with the network bandwidth that is available to transmit data; determining a quality of the document data that is transmitted from the terminal device to a different terminal device in accordance with a transmission rate that is assigned to the document data; converting a quality of the document data that is input from the external device such that equal to or less than the determined quality is obtained; encoding multiple sets of data that include the converted document data by using transmission rates that are assigned to the sets of data; and transmitting multiple sets of encoded data to a different terminal device.

The present invention also provides a non-transitory computer-readable recording medium having computer readable program codes, performed by a computer as a terminal device in a transmission system where, to cause multiple users who use terminal devices to perform a communication, multiple sets of data are encoded, transmitted, and received via a network between the terminal devices, the program codes when executed causing the computer to function as: a data receiving unit that receives document data from an external device; a network-information acquiring unit that acquires a network bandwidth that is available to transmit data; an assigning unit that assigns a transmission rate to each set of data that is to be transmitted to a different terminal device in accordance with the network bandwidth that is available to transmit data; a quality determining unit that determines a quality of the document data that is transmitted from the terminal device to a different terminal device in accordance with a transmission rate that is assigned to the document data; a quality converting unit that converts a quality of the document data that is input from the external device such that equal to or less than the determined quality is obtained; an encoding unit that encodes multiple sets of data that include the converted document data by using transmission rates that are assigned to the sets of data; and a transmitting unit that transmits multiple sets of encoded data to a different terminal device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a diagram that illustrates an example of the table that stores the set values of the resolution, the frame rate, and the color depth according to the first embodiment;

FIG. 17 is a diagram that illustrates an example of the table that stores the set values of the resolution, the frame rate, and the color depth according to the second embodiment.

DETAILED DESCRIPTION OF THE PREFERRED EMBODIMENTS

First Embodiment

An explanation is given below, with reference to the drawings, of a transmission system 10 according to a first embodiment of the present invention. The transmission system 10 is a system for users who are located at remote positions from one another to perform a communication.

Overall Configuration

Figure 1:
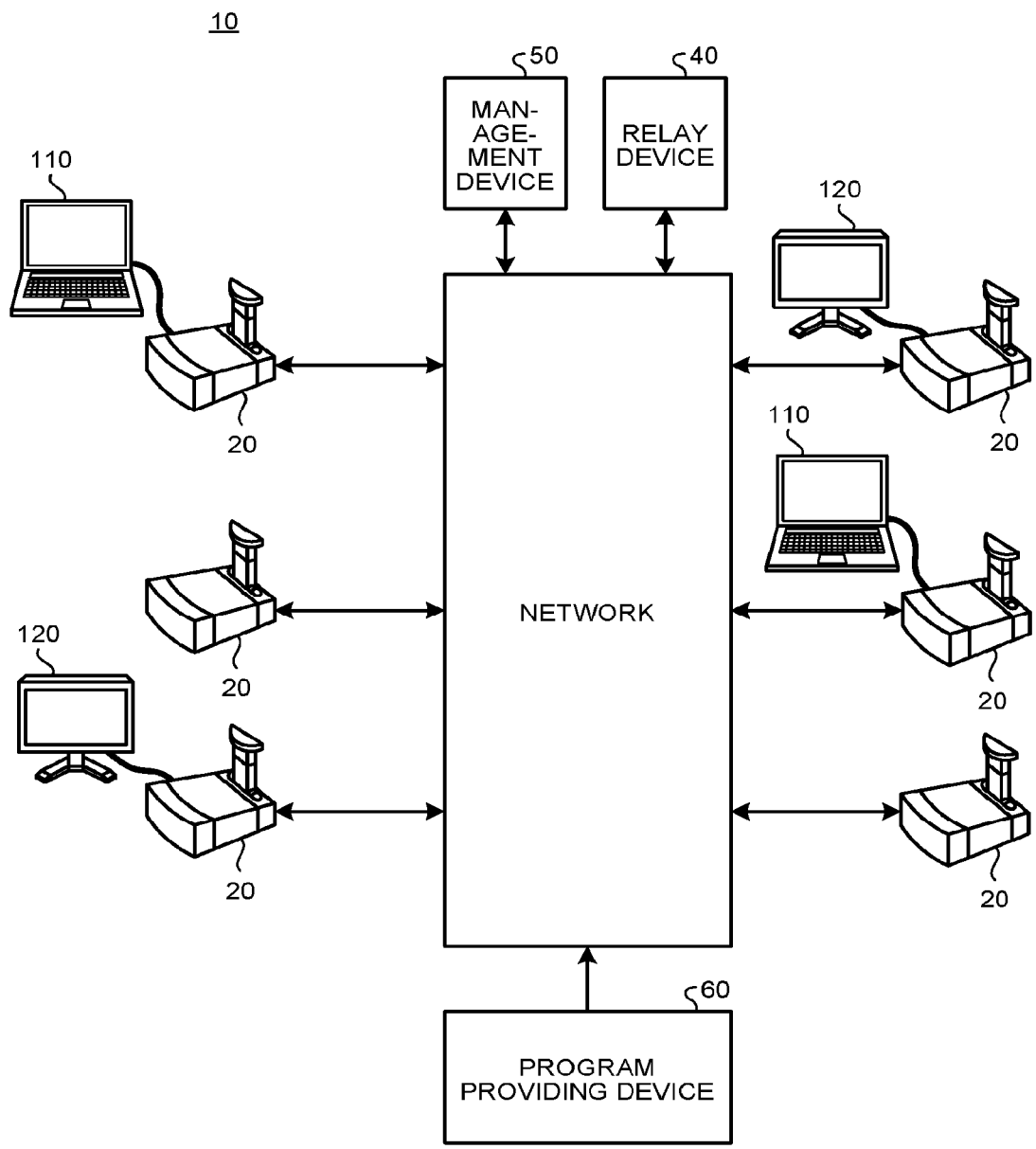
FIG. 1 is a diagram that illustrates a transmission system according to a first embodiment of the present invention.

FIG. 1 is a diagram that illustrates the transmission system 10 according to the embodiment. The transmission system 10 includes multiple terminal devices 20, a relay device 40, a management device 50, and a program providing device 60.

The terminal devices 20, the relay device 40, the management device 50, and the program providing device 60 are connected to one another via a network so that data transmission and reception are conducted. The network may be any network, such as a local area network (LAN), a wide area network (WAN), or a WAN with a public network included.

The transmission system 10 is a communication system for transmitting and receiving multiple types of data among the terminal devices 20, thereby causing the users who use the terminal devices 20 to perform a communication. According to the present embodiment, an explanation is given of an example in which the transmission system 10 is applied to a television (video) conference system, or the like. The transmission system 10 is applicable to not only a television conference system but also, for example, an audio conference system, a voice phone system (including a mobile-phone system), a text chat system, or a whiteboard sharing system.

The terminal device 20 is operated by a user. The terminal device 20 performs various types of data inputs and data outputs. Data that is input and output by the terminal device 20 is, for example, audio data that is obtained by collecting the voice of the user of the terminal device 20, video data that is obtained by capturing the user of the terminal device 20, document data that is used as a document that is referred to by the user of the terminal device 20, or text data. Here, the text data may be data that indicates a message that is used during chats, or the like. The above-described terminal device 20 is capable of converting the information that is input by a user or the signal that is acquired from the environment into transmission data and transmitting it to the different terminal device 20 via the relay device 40. Furthermore, the terminal device 20 is capable of receiving transmission data from the different terminal device 20 via the relay device 40, reproducing the received data, and outputting it to a user.

According to the present embodiment, the terminal device 20 is a device that is dedicated to a television conference system. Instead, the terminal device 20 may be, for example, a desktop or notebook computer, a mobile information device, such as a smartphone or a tablet terminal, an electronic blackboard, a projector, a vehicle, or industrial equipment. The terminal device 20 is not limited to the above devices, but it may be a different device that is capable of performing a communication via a network and inputting/outputting information.

Furthermore, the terminal device 20 is connectable to a computer 110 that is an example of an external device. The computer 110 executes an application program, such as a presentation program, and transmits document data, which is the result of execution, to the terminal device 20. Then, the terminal device 20 transmits the document data to the different terminal device 20 via the relay device 40.

The document data is data that is generated by various programs, such as a document preparation program, a spreadsheet program, a presentation program, a drawing generation program, or a photo editing program. According to this example, the document data is the image data that is displayed on the screen by the computer 110 as the result of execution of the above program. The document data may be a moving image or a still image. Furthermore, the document data may be colored or gray-scaled. Moreover, the document data may have any resolution, frame rate, and color depth (the number or bits of data).

Furthermore, a display 120 can be connected to the terminal device 20. If the terminal device 20 is connected to the computer 110 or the display 120, the terminal device 20 can receive document data from the different terminal device 20 via the relay device 40 and can display it on the computer 110 or the display 120.

The relay device 40 is an information processing device, such as a server or a computer. The relay device 40 forwards, to the different terminal device 20, the data that is received from one of the terminal devices 20.

The management device 50 is an information processing device, such as a server or a computer. The management device 50 establishes a communication among the terminal devices 20 via the relay device 40 and forms a session of the terminal devices 20.

The program providing device 60 is an information processing device, such as a server or a computer. The program providing device 60 is capable of storing programs for causing the terminal device 20 to implement various functions or units and transmitting the program to the terminal device 20. Furthermore, the program providing device 60 is capable of storing programs for causing the relay device 40 to implement various functions or units and transmitting the program to the relay device 40. Moreover, the program providing device 60 is capable of storing programs for causing the management device 50 to implement various functions or units and transmitting the program to the management device 50.

Figure 2:
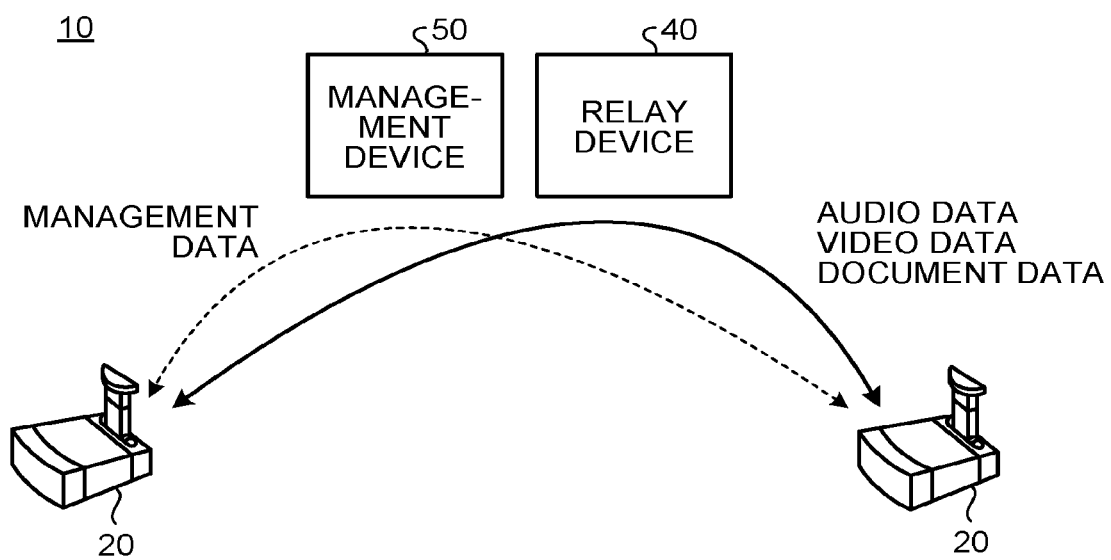
FIG. 2 is a diagram that illustrates a data transmission operation by the transmission system.

FIG. 2 is a diagram that illustrates a data transmission operation by the transmission system 10. The relay device 40 controls forwarding of data (audio data, video data, document data, or the like) between the terminal devices 20. The management device 50 controls forwarding of management data, forms a session between the terminal devices 20, and enables transmission and reception of data between the terminal devices 20 for which the session is formed.

The relay device 40 and the management device 50 may be implemented by using a single server, computer, or the like, or may be implemented by operating multiple servers or computers in cooperation with one another. Furthermore, both the relay device 40 and the management device 50 may be implemented by using a single server or computer. Moreover, the management device 50 may be implemented by using any of the terminal devices 20.

(External Appearance and Hardware Configuration)

Figure 3:
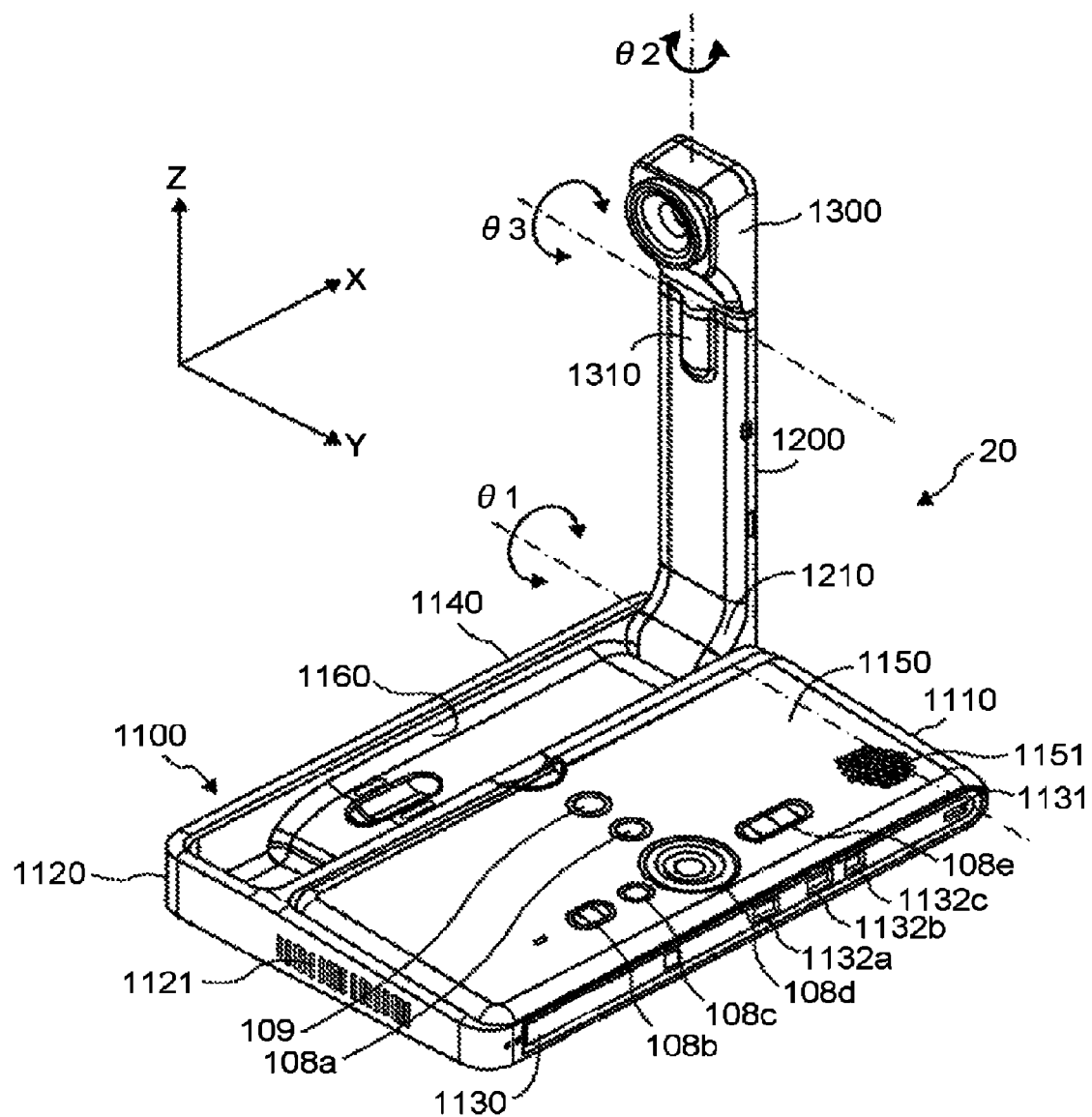
FIG. 3 is a diagram that illustrates an example of the external appearance of a terminal device.

FIG. 3 is a diagram that illustrates an example of the external appearance of the terminal device 20. Here, in FIG. 3, a predetermined direction on the horizontal plane is an axis-X direction (the front-back direction). Furthermore, in FIG. 3, the direction perpendicular to the axis-X direction on the horizontal plane is an axis-Y direction, and the direction (the vertical direction) perpendicular to the axis-X direction and the axis-Y direction is an axis-Z direction.

As illustrated in FIG. 3, the terminal device 20 includes a chassis 1100, an arm 1200, and a camera housing 1300. Multiple undepicted air intake holes are formed on a rear-side wall surface 1110 of the chassis 1100. Multiple air exhaust holes 1121 are formed on a front-side wall surface 1120 of the chassis 1100. Thus, the terminal device 20 can receive external air from the back side and exhaust air to the front side via the air exhaust holes 1121 due to driving of a cooling fan that is built in the chassis 1100. A sound pickup hole 1131 is formed on a right-side wall surface 1130 of the chassis 1100. Thus, the terminal device 20 is capable of collecting sounds, such as the voice that is produced by a user, the ambient sounds, or noises, via a built-in microphone 114 that is described later.

An operation panel 1150 is formed on the right side of the upper section of the chassis 1100. The operation panel 1150 is provided with multiple operation buttons 108*a* to 108*e* and a power switch 109. Here, the operation buttons 108*a* to 108*e* are sometimes referred to as an operation button 108 as one. Furthermore, the operation panel 1150 is provided with multiple sound output holes 1151 that transmit the sound that is output from a built-in speaker 115 that is described later.

Furthermore, a housing recessed portion 1160 for housing the arm 1200 and the camera housing 1300 is formed on the left side of the upper section of the chassis 1100. The right-side wall surface 1130 of the chassis 1100 is provided with multiple connecting ports 1132*a* to 1132*c* for electrically connecting a cable to an external-device connecting interface (I/F) 118 for connecting to the computer 110, which is an external device, as described later. A left-side wall surface 1140 of the chassis 1100 is provided with an undepicted connecting port for electrically connecting a cable for the display 120 to a display I/F 117 that is described later.

The arm 1200 is attached to the chassis 1100 via a torque hinge 1210. The arm 1200 is rotatable in an up and down direction in the range of a tilt angle θ1, e.g., 135 degrees, with respect to the chassis 1100. Here, FIG. 3 illustrates the arm 1200 in a state where the tilt angle θ1 is 90 degrees.

The camera housing 1300 is provided with a built-in camera 112 that is described later. This allows the terminal device 20 to capture a user, documents, a room, or the like. Furthermore, the camera housing 1300 is attached to the arm 1200 via a torque hinge 1310. The camera housing 1300 is rotatable in upward, downward, leftward, or rightward directions in the range of a pan angle θ2 of ±180 degrees and in the range of a tilt angle θ3 of ±45 degrees with respect to the arm 1200, where the state that is illustrated in FIG. 3 is defined as 0 degree.

Figure 4:
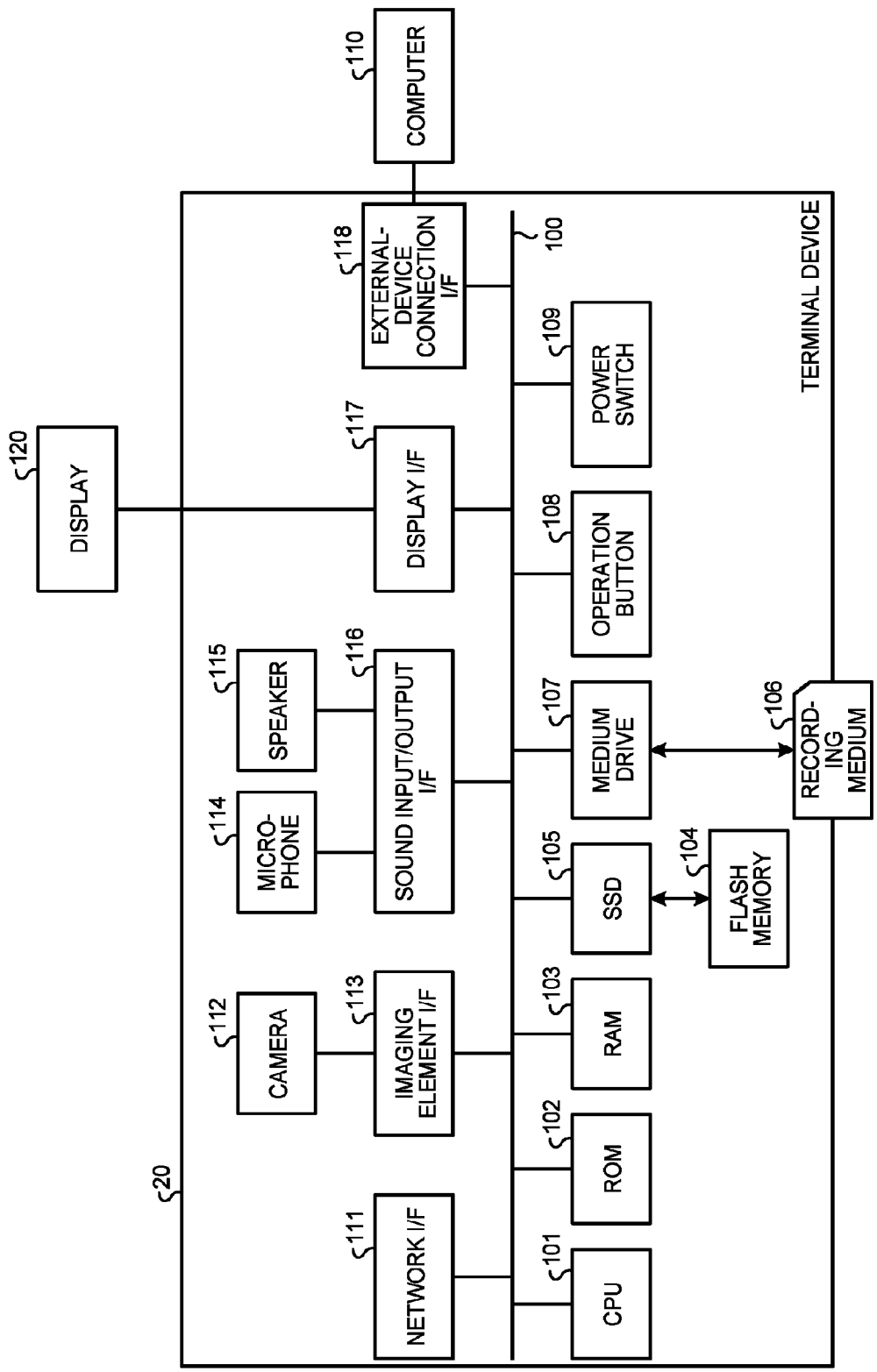
FIG. 4 is a diagram that illustrates a hardware configuration of the terminal device.

FIG. 4 is a diagram that illustrates a hardware configuration of the terminal device 20. The terminal device 20 includes a bus line 100, a central processing unit (CPU) 101, a read only memory (ROM) 102, a random access memory (RAM) 103, a flash memory 104, a solid state drive (SSD) 105, a medium drive 107, the operation button 108, the power switch 109, a network I/F 111, the camera 112, an imaging element I/F 113, the microphone 114, the speaker 115, a sound input/output I/F 116, the display I/F 117, and an external-device connection I/F 118.

The bus line 100 is an address bus, a data bus, or the like, for connecting various components.

The CPU 101 controls the overall operation of the terminal device 20. The ROM 102 stores programs, such as an initial program loader (IPL), that are used for driving the CPU 101. The RAM 103 is used as a work area for the CPU 101. The flash memory 104 stores various types of data, such as a forwarding control program for the terminal device 20, video data, or audio data. The terminal device 20 may include an electrically erasable and programmable ROM (EEPROM), or the like, instead of the flash memory 104. The SSD 105 controls reading or writing of various types of data from or to the flash memory 104 under the control of the CPU 101. The medium drive 107 controls reading or writing (storing) of data from or to a recording medium 106, such as a flash memory, that can be attached to or detached from the terminal device 20.

The operation button 108 is a button for inputting user's operation information when the forwarding destination of data is selected, or the like. The power switch 109 is a button for switching on/off the power of the terminal device 20. The network I/F 111 controls communications via a network.

The camera 112 captures an object and obtains video data under the control of the CPU 101. The camera 112 includes a lens and a solid-state imaging element that converts light into an electric charge and computerizes the image (video) of the object. A complementary metal-oxide semiconductor (CMOS), a charge-coupled device (CCD), or the like, is used for the solid-state imaging element.

The imaging element I/F 113 controls driving of the camera 112. The microphone 114 is of a built-in type, and it receives sounds. The speaker 115 is of a built-in type, and it outputs sounds. The sound input/output I/F 116 processes an input/output of a sound signal between the microphone 114 and the speaker 115 under the control of the CPU 101.

The display I/F 117 transmits video data to the externally connected display 120 under the control of the CPU 101. The display 120 presents the image of an object, an operation icon, or the like. The display 120 is connected to the display I/F 117 via a cable. The cable may be a cable for analog RGB (VGA) signals, a cable for a component video, or a cable for High-Definition Multimedia Interface (HDMI) (registered trademark) or digital video interactive (DVI) signals.

The external-device connection I/F 118 is an interface circuit that is connected to the connecting ports 1132a to 1132c and that controls an external device under the control of the CPU 101. The external-device connection I/F 118 is connectable to an external device, such as an externally connected camera, an externally connected microphone, or an externally connected speaker, via a universal serial bus (USB) cable, or the like. According to the present embodiment, the external-device connection I/F 118 is connected to the computer 110 for displaying document data via a cable.

If an external camera is connected, the CPU 101 drives the externally connected camera with priority over the built-in camera 112. Furthermore, if an external microphone is connected and if an external speaker is connected, the CPU 101 drives the externally connected microphone and the externally connected speaker with priority over the built-in microphone 114 and the built-in speaker 115.

Furthermore, the camera 112, the microphone 114, and the speaker 115 do not always need to be built in, but only an external camera, an external microphone, and an external speaker may be connected. Furthermore, the display 120 may be built in the terminal device 20. Moreover, the terminal device 20 may be connected to a projection device, such as a projector, instead of the display 120.

Figure 5:
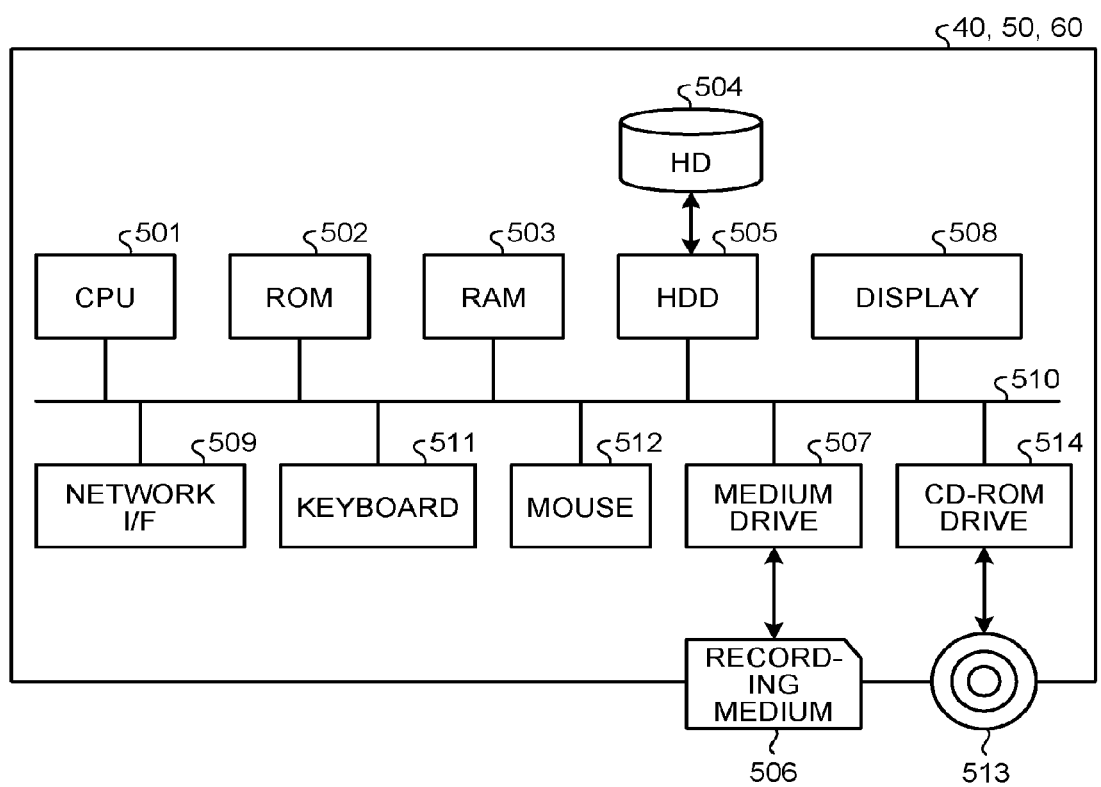
FIG. 5 is a diagram that illustrates a hardware configuration of a relay device, a management device, and a program providing device.

FIG. 5 is a diagram that illustrates a hardware configuration of the relay device 40, the management device 50, and the program providing device 60. Here, the external appearances of the relay device 40, the management device 50, and the program providing device 60 are the same as that of a typical server or computer, and therefore their explanations are omitted. Furthermore, the management device 50 and the program providing device 60 have the same hardware configuration as that of the relay device 40, and therefore an explanation is given by using the hardware configuration of the relay device 40 as a representative of them.

The relay device 40 includes a CPU 501, a ROM 502, a RAM 503, a hard disk (HD) 504, a hard disk drive (HDD) 505, a medium drive 507, a display 508, a network I/F 509, a bus line 510, a keyboard 511, a mouse 512, and a CD-ROM drive 514.

The CPU 501 controls the overall operation of the relay device 40. The ROM 502 stores a program, such as the IPL, that is used for driving the CPU 501. The RAM 503 is used as a work area for the CPU 501. The HD 504 stores various types of data, such as a forwarding control program for the relay device 40. The HDD 505 controls reading or writing of various types of data from or to the HD 504 under the control of the CPU 501. The medium drive 507 controls reading or writing (storing) of data from or to a removable recording medium 506 such as a flash memory. The display 508 presents various types of information, such as a cursor, menu, window, character, or image. The network I/F 509 controls a communication via a network.

The keyboard 511 includes multiple keys for inputting a character, numerical value, various commands, or the like. The mouse 512 selects or executes various commands, selects a processing target, moves a cursor, or the like. The CD-ROM drive 514 controls reading or writing of various types of data from or to a compact disc read only memory (CD-ROM) 513 that is an example of a removable recording medium. The bus line 510 is an address bus, a data bus, or the like, for connecting various components.

Here, FIG. 5 illustrates the hardware configuration in a case where the relay device 40 is configured by using a single computer. However, the relay device 40 may be configured by using multiple computers that are connected to one another via a network, or the like, and that are operated in cooperation with one another.

(Functional Configurations of the Terminal Device 20, the Relay Device 40, and the Management Device 50)

Figure 6:
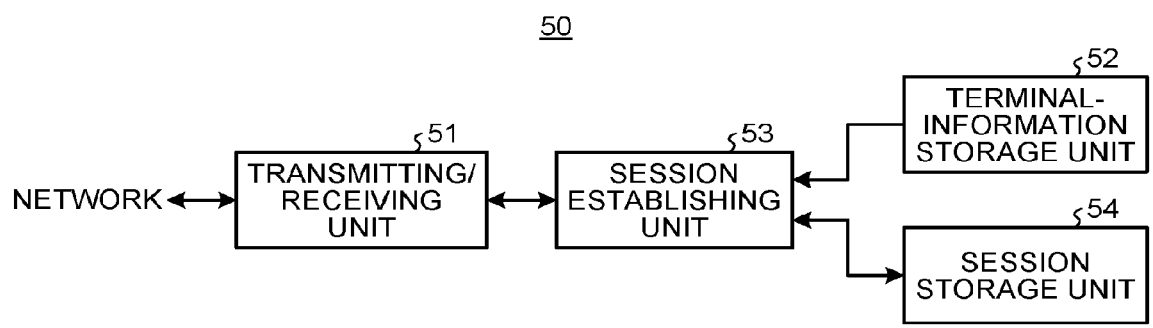
FIG. 6 is a diagram that illustrates the functional configuration of the management device.

FIG. 6 is a diagram that illustrates the functional configuration of the management device 50. With regard to the management device 50, the CPU 501 illustrated in FIG. 5 executes a program and cooperates with a different hardware resource if needed, whereby the function of each block illustrated in FIG. 6 is implemented. Furthermore, part of the management device 50 illustrated in FIG. 6 may be configured by using hardware.

The management device 50 includes a transmitting/receiving unit 51, a terminal-information storage unit 52, a session establishing unit 53, and a session storage unit 54. The transmitting/receiving unit 51 transmits and receives data to and from the terminal device 20 and the relay device 40 via a network.

The terminal-information storage unit 52 stores information that is needed to access each of the terminal devices 20. For example, the terminal-information storage unit 52 stores the terminal ID for identifying each of the terminal devices 20, the name for identifying each of the terminal devices 20, the IP address on the network, or the like.

The session establishing unit 53 establishes a session that is formed by the terminal devices 20. After the terminal devices 20 form a session, they can transmit and receive data from each other via the relay device 40.

The session storage unit 54 stores the information related to the session that is established by the session establishing unit 53. For example, the session storage unit 54 stores the session ID for identifying a session, the IP address of the terminal device 20 that forms a session, or the like.

Figure 7:
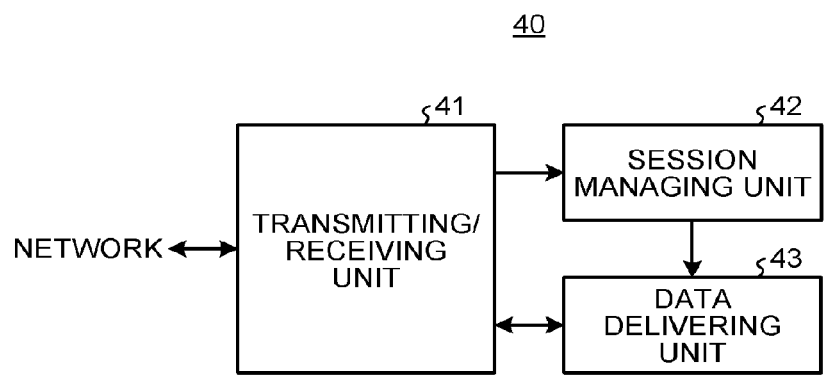
FIG. 7 is a diagram that illustrates the functional configuration of the relay device.

FIG. 7 is a diagram that illustrates the functional configuration of the relay device 40. With regard to the relay device 40, the CPU 501 illustrated in FIG. 5 executes a program and cooperates with a different hardware resource if needed, whereby the function of each block illustrated in FIG. 7 is implemented. Furthermore, part of the function of the relay device 40 illustrated in FIG. 7 may be configured by using hardware.

The relay device 40 includes a transmitting/receiving unit 41, a session managing unit 42, and a data delivering unit 43. The transmitting/receiving unit 51 transmits and receives data to and from the terminal device 20 and the management device 50 via a network.

The session managing unit 42 acquires, from the management device 50, the information related to the session, which is established by the management device 50, and stores it. The data delivering unit 43 delivers the data that is transmitted by any of the terminal devices 20, which form the session, to each of the terminal devices 20 that form the session.

Figure 8:
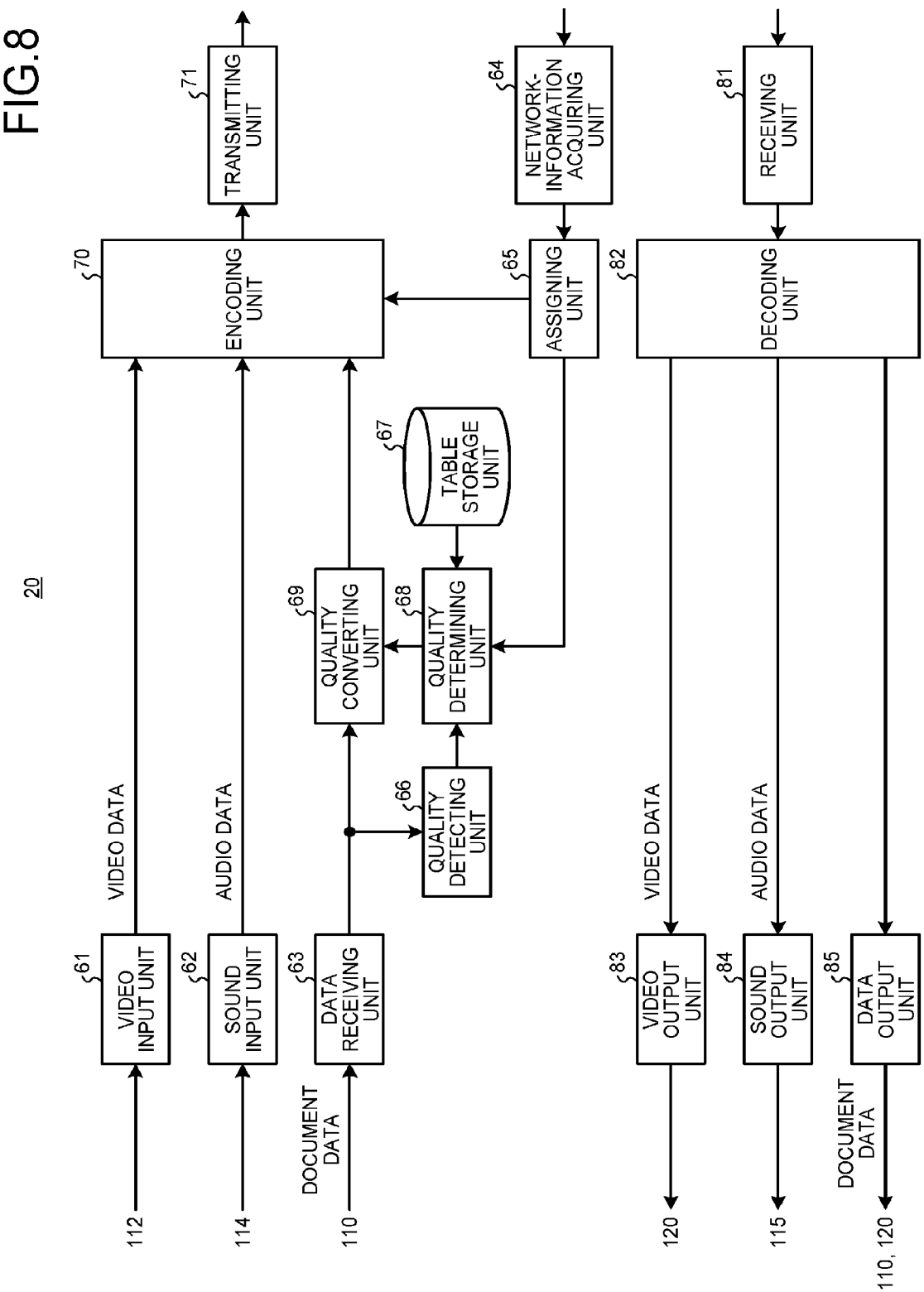
FIG. 8 is a diagram that illustrates the functional configuration of the terminal device.

FIG. 8 is a diagram that illustrates the functional configuration of the terminal device 20. With regard to the terminal device 20, the CPU 101 illustrated in FIG. 4 executes a program and cooperates with a different hardware resource if needed, whereby the function of each block illustrated in FIG. 8 is implemented. Furthermore, part of the function of the terminal device 20 illustrated in FIG. 8 may be configured by using hardware.

The terminal device 20 includes a video input unit 61, a sound input unit 62, a data receiving unit 63, a network-information acquiring unit 64, an assigning unit 65, a quality detecting unit 66, a table storage unit 67, a quality determining unit 68, a quality converting unit 69, an encoding unit 70, a transmitting unit 71, a receiving unit 81, a decoding unit 82, a video output unit 83, a sound output unit 84, and a data output unit 85.

The video input unit 61 controls the camera 112 that is illustrated in FIG. 4 so as to generate video data by capturing an object. The video input unit 61 forwards the generated video data to the encoding unit 70.

The sound input unit 62 controls the microphone 114 illustrated in FIG. 4 so as to collect the voice that is produced by the user of the terminal device 20 and generate audio data. The sound input unit 62 forwards the generated audio data to the encoding unit 70.

The data receiving unit 63 is connected to the computer 110, which is an external device, and receives document data from the computer 110. According to the present embodiment, the document data is image data that is displayed on the screen when the computer 110 executes a document preparation program, a spreadsheet program, a presentation program, a drawing generation program, a photo editing program, or the like.

The network-information acquiring unit 64 acquires the available network bandwidth with which the terminal device 20 transmits data to the different terminal device 20. For example, the network-information acquiring unit 64 acquires the amount of data (e.g., the number of bits) that can be transmitted by the terminal device 20 per unit time (e.g., one second).

The assigning unit 65 assigns a transmission rate to each set of data that is to be transmitted from the terminal device 20 to the different terminal device 20 on the basis of the network bandwidth that is available to transmit the data and that is acquired by the network-information acquiring unit 64. The transmission rate is, for example, the maximum amount of data (e.g., the number of bits) that can be transmitted per unit time (e.g., one second). According to the present embodiment, the terminal device 20 transmits video data, audio data, and document data, and therefore the assigning unit 65 assigns a transmission rate to each of the video data, the audio data, and the document data.

The quality detecting unit 66 detects the quality of document data that is input from the computer 110. According to the present embodiment, the quality detecting unit 66 detects the resolution (the number of dots in a horizontal direction×a vertical direction) of the document data that is input from the computer 110, the frame rate (fps, the number of frames per second), and the color depth (bit).

The table storage unit 67 stores a table. The table stores the set value of the parameter that indicates the quality of document data with respect to each range of the transmission rate of the document data. According to the present example, the table stores the set values of the resolution of document data, the frame rate, and the color depth with respect to each range of the transmission rate of the document data.

The quality determining unit 68 determines the quality of document data that is transmitted from the terminal device 20 to the different terminal device 20 on the basis of the transmission rate that is assigned to the document data by the assigning unit 65. According to the present embodiment, the quality determining unit 68 extracts, from the table that is stored in the table storage unit 67, the resolution, the frame rate, and the color depth that correspond to the transmission rate that is assigned to the document data. Then, the quality determining unit 68 determines the resolution, the frame rate, and the color depth during the transmission of the document data on the basis of the extracted information. Here, the quality determining unit 68 determines the quality such that, if document data is encoded by using the assigned transmission rate and it is then decoded, degradation of the quality falls within a range such that a user can understand the contents.

The quality converting unit 69 converts the quality of the document data that is input from the computer 110 such that it becomes equal to or less than the quality that is determined by the quality determining unit 68. The quality converting unit 69 forwards, to the encoding unit 70, the document data whose quality has been converted.

According to the present embodiment, the quality converting unit 69 performs a conversion operation on the document data, which is input from the computer 110, such that it has the resolution, the frame rate, and the color depth that are determined by the quality determining unit 68. Here, if the resolution, the frame rate, and the color depth of the document data, which is input from the computer 110, are equal to or less than the resolution, the frame rate, and the color depth that are determined by the quality determining unit 68, the quality converting unit 69 does not need to perform a conversion operation on the parameters.

The encoding unit 70 encodes multiple sets of data that includes the converted document data by using the transmission rate that is assigned to each of them. According to the present embodiment, the encoding unit 70 encodes the video data that is generated by the video input unit 61, audio data that is collected by the sound input unit 62, and the document data whose quality has been converted by the quality converting unit 69, by using the transmission rates that are assigned to them by the assigning unit 65.

The transmitting unit 71 transmits multiple sets of encoded data to the different terminal device 20 via the network. According to the present embodiment, the transmitting unit 71 transmits the video data, the audio data, and the document data, which are encoded, to the relay device 40 via the network.

The receiving unit 81 receives the data, which is transmitted from the different terminal device 20, via the relay device 40. According to the present embodiment, the receiving unit 81 receives at least one of the encoded video data, the encoded audio data, and the encoded document data that are transmitted from the different terminal device 20.

The decoding unit 82 decodes the data that is received by the receiving unit 81 from the relay device 40. According to the present embodiment, the decoding unit 82 decodes the video data, the audio data, and the document data.

The video output unit 83 receives the video data that is decoded by the decoding unit 82 and controls the display 120 that is illustrated in FIG. 4 so as to display the image that corresponds to the video data on the display 120. Thus, the video output unit 83 is capable of displaying the user's image that is captured by the different terminal device 20.

The sound output unit 84 receives the audio data that is decoded by the decoding unit 82 and controls the speaker 115 that is illustrated in FIG. 4 so as to externally output the sound that corresponds to the audio data. Thus, the sound output unit 84 is capable of outputting the sound that is collected by the different terminal device 20.

The data output unit 85 receives the document data that is decoded by the decoding unit 82 and outputs it to the computer 110 that is illustrated in FIG. 4. The computer 110 displays the document data that is received from the data output unit 85. Thus, the data output unit 85 is capable of displaying, on the computer 110 that is connected to it, the document data that is displayed on the computer 110 that is connected to the different terminal device 20. Furthermore, the data output unit 85 may transmit the document data to the display 120 and present the document data on the display 120.

(Operation Details)

Figure 9:
FIG. 9 is a diagram that illustrates an example of the transmission rates that are assigned to video data, audio data, and document data.

FIG. 9 is a diagram that illustrates an example of the transmission rates that are assigned to video data, audio data, and document data.

The network-information acquiring unit 64 may acquire the network bandwidth that is available to transmit data from, for example, the actual communication result. For example, the network-information acquiring unit 64 calculates the total of the transmission rates of the video data, the audio data, and the document data that have been actually transmitted in the past and calculates the network bandwidth on the transmitting side.

Furthermore, the network-information acquiring unit 64 prepares unique data by using, for example, a Transmission Control Protocol (TCP) and transmits a certain amount of the prepared data to a different device on the network. The network-information acquiring unit 64 measures the time (the round-trip delay time RTT) from when the certain amount of data is transmitted until when a confirmatory response is received from the different device. Then, the network-information acquiring unit 64 may calculate the bandwidth on the basis of the relationship between the amount of data and the round-trip delay time RTT. For example, the network-information acquiring unit 64 calculates the data amount (bit)/RTT, thereby calculating the bandwidth (kbps). Furthermore, the network-information acquiring unit 64 may calculate the bandwidth by using a different known method.

For example, the assigning unit 65 divides the calculated network bandwidth on the transmitting side by using a predetermined rule and assigns a transmission rate to each set of data (video data, audio data, and document data). For example, the assigning unit 65 may divide the bandwidth by using a predetermined ratio and assign it to video data, audio data, and document data.

Furthermore, the assigning unit 65 may assign a fixed transmission rate to specific data among multiple sets of data, divide the remaining bandwidth at a predetermined ratio, and assign it to the other sets of data. According to the present embodiment, the assigning unit 65 assigns a fixed transmission rate (72 kbps) to audio data. Thus, the terminal device 20 can transmit audio data without degradation, and at least audio data can be transmitted without fail. Furthermore, according to the present embodiment, the assigning unit 65 assigns the remaining bandwidth (in this example, 300 kbps), which is obtained by removing the bandwidth of the audio data from the available network bandwidth, to the video data and the document data on a one-to-one basis. Therefore, in this case, the assigning unit 65 assigns 150 kbps to the video data and assigns 150 kbps to the document data. Furthermore, the assigning unit 65 may assign transmission rates to multiple sets of data by using a different method.

Figure 10:
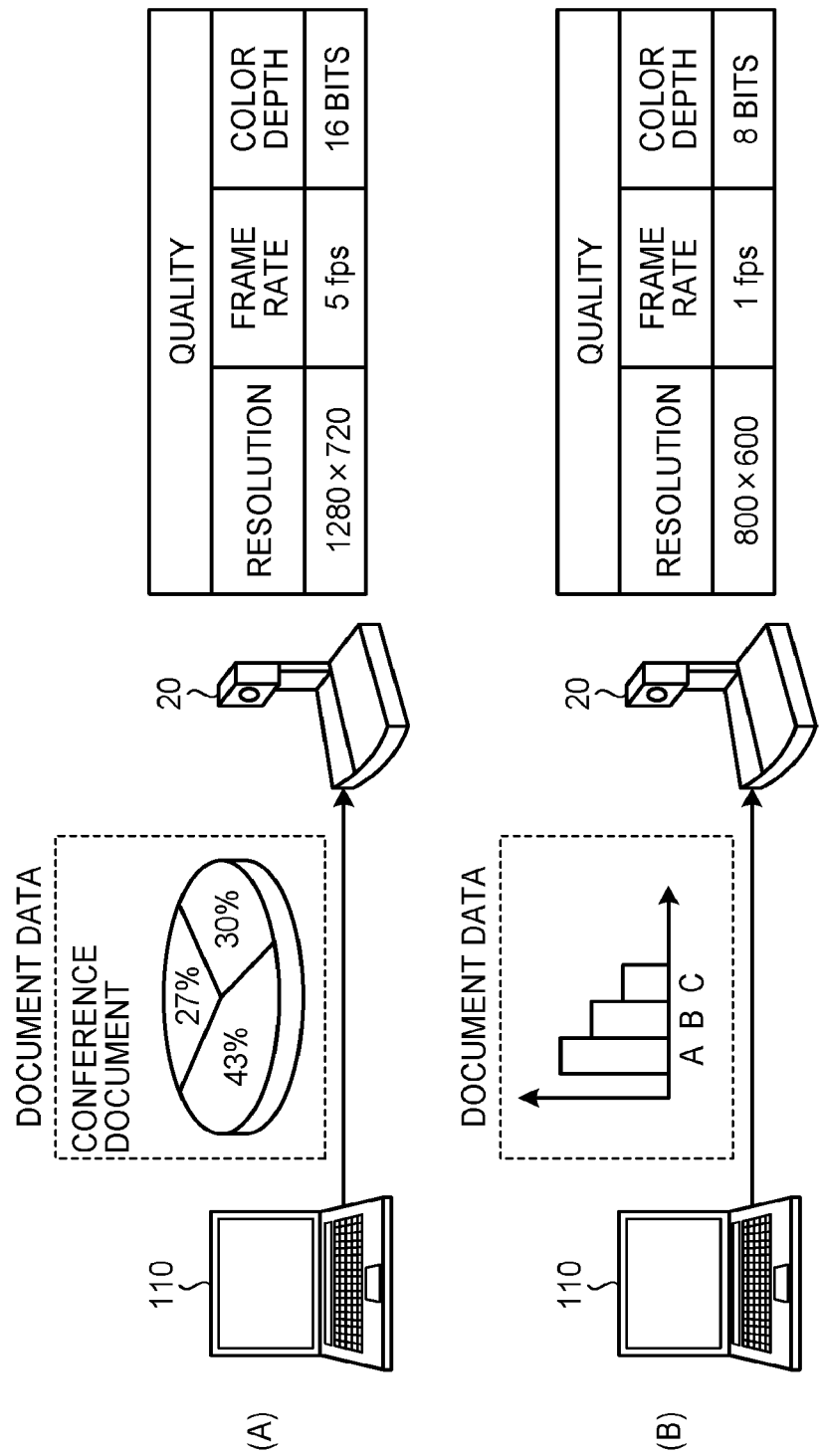
FIG. 10 is a diagram that illustrates an example of the detection result of the quality of document data.

FIG. 10 is a diagram that illustrates an example of the detection result of the quality of document data. The quality detecting unit 66 detects the quality of the document data that is input from the computer 110.

In the example of (A) of FIG. 10, the quality detecting unit 66 detects that the input document data has a resolution of 1280×720 dots, a frame rate of 5 fps, and a color depth of 16 bits. Furthermore, in the example of (B) of FIG. 10, the quality detecting unit 66 detects that the input document data has a resolution of 800×600 dots, a frame rate of 1 fps, and a color depth of 8 bits.

Furthermore, the quality detecting unit 66 may detect whether the document data is colored or gray-scaled. Moreover, the quality detecting unit 66 may detect the value of a parameter that indicates a different quality.

FIG. 11 is a diagram that illustrates an example of the table that stores the set values of the resolution, the frame rate, and the color depth according to the first embodiment.

For example, as illustrated in FIG. 11, the table storage unit 67 stores the table that stores the set values of the resolution, the frame rate, and the color depth with respect to each rate range. For example, the table stores the set values of the resolution, the frame rate, and the color depth with respect to each of the transmission rate ranges, i.e., less than 300 kbps, equal to or greater than 300 kbps and less than 500 kbps, equal to or greater than 500 kbps and less than 1000 kbps, and equal to or greater than 1000 kbps.

The set value of each parameter that is stored in the table is the value that is previously defined by a designer, or the like, and it is the value such that, if document data is encoded by using the corresponding transmission rate and it is then decoded, degradation of the image falls within an acceptable range. Specifically, if document data is converted to have the quality that corresponds to the set value that is stored in the table and is then encoded by using the corresponding transmission rate, the contents of the decoded document data can be recognized by at least a user.

Figure 12:
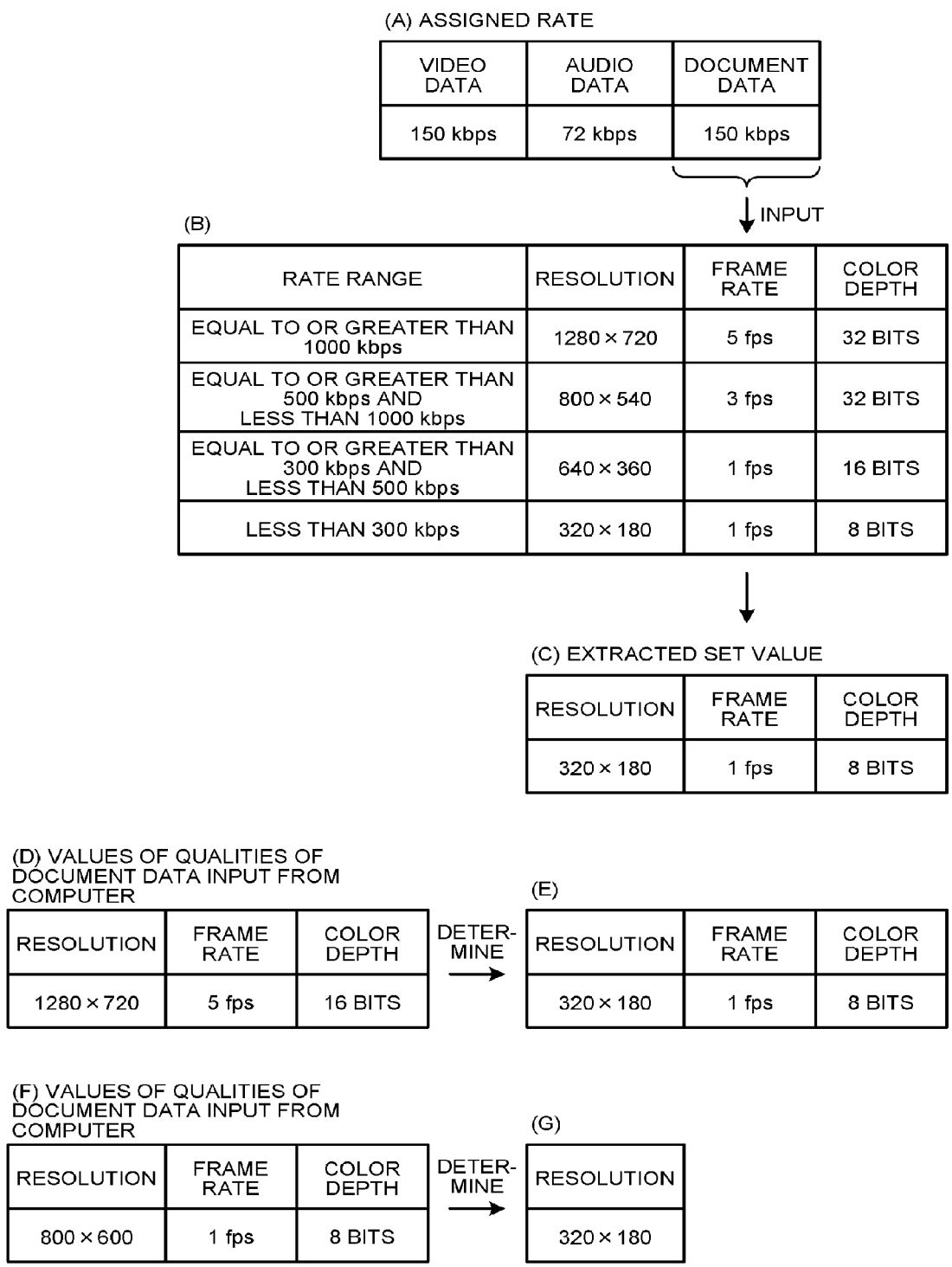
FIG. 12 is a diagram that illustrates an example of the quality that is determined to be converted.

FIG. 12 is a diagram that illustrates an example of the quality that is determined to be converted. The quality determining unit 68 extracts, from the table that is stored in the table storage unit 67, the set values of the qualities that are stored such that they are related to the transmission rate that is assigned to the document data.

For example, as illustrated in (A) of FIG. 12, it is assumed that 150 kbps is assigned to the document data. In this case, the quality determining unit 68 extracts, from the table that is illustrated in (B) of FIG. 12, the set values that correspond to the rate range of less than 300 kbps. Therefore, as illustrated in (C) of FIG. 12, the quality determining unit 68 extracts 320×180 dots as the set value of the resolution, 1 fps as the set value of the frame rate, and 8 bits as the set value of the color depth.

Next, the quality determining unit 68 compares each of the values of the qualities of the document data, which is input from the computer 110, with each of the set values of the qualities that are extracted from the table. Then, the quality determining unit 68 determines that the quality that needs to be converted is the quality for which the value of the document data that is input from the computer 110 is larger than the set value that is extracted from the table. Then, the quality converting unit 69 converts the document data, which is input from the computer 110, with regard to the quality that is determined to be converted into the set value that is extracted from the table.

For example, as illustrated in (D) of FIG. 12, it is assumed that the document data, which is input from the computer 110, has a resolution of 1280×720 dots, a frame rate of 5 fps, and a color depth of 16 bits. In this case, with regard to all of the resolution, the frame rate, and the color depth, the value of the document data that is input from the computer 110 is larger than the set value that is extracted from the table. Therefore, in this case, the quality determining unit 68 determines that all of the resolution, the frame rate, and the color depth are the qualities that need to be converted. Then, as illustrated in (E) of FIG. 12, the quality converting unit 69 converts the document data, which is input from the computer 110, into the set value that is extracted from the table with regard to the resolution, the frame rate, and the color depth that are determined to be converted.

Conversely, as illustrated in (F) of FIG. 12, it is assumed that the document data that is input from the computer 110 has a resolution of 800×600 dots, a frame rate of 1 fps, and a color depth of 8 bits. In this case, with regard to the resolution, the value of the document data that is input from the computer 110 is larger than the set value that is extracted from the table. However, with regard to the frame rate and the color depth, the value of the document data that is input from the computer 110 is the same as the set value that is extracted from the table. Therefore, in this case, the quality determining unit 68 determines that the resolution is the quality that needs to be converted. Then, as illustrated in (G) of FIG. 12, the quality converting unit 69 converts the document data, which is input from the computer 110, into the set value that is extracted from the table with regard to only the resolution that is determined to be converted.

Here, if the value of the document data that is input from the computer 110 is smaller than the set value that is extracted from the table, the quality converting unit 69 does not perform an operation to obtain a higher quality (up-conversion, or the like), for example.

Figure 13:
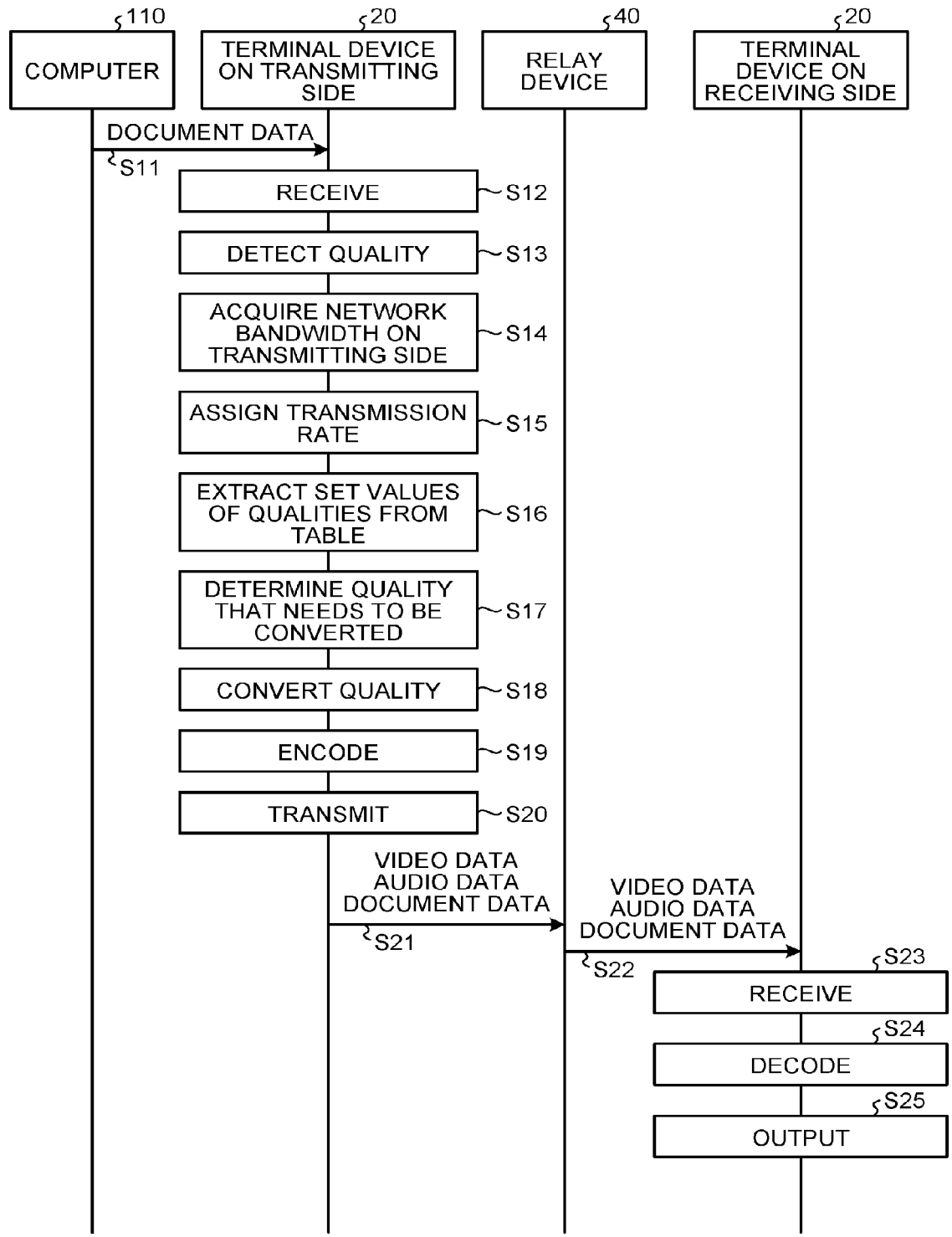
FIG. 13 is a sequence diagram that illustrates the steps of an operation of the transmission system.

FIG. 13 is a sequence diagram that illustrates the steps of an operation of the transmission system 10. First, the computer 110 transmits the document data to the terminal device 20 on the transmitting side (Step S11). Then, the terminal device 20 on the transmitting side receives the document data from the computer 110 that is connected to the terminal device 20 (Step S12).

Then, the terminal device 20 on the transmitting side detects the quality (e.g., the resolution, the frame rate, and the color depth) of the input document data (Step S13). Next, the terminal device 20 on the transmitting side acquires the network bandwidth on the transmitting side (Step S14).

Here, the terminal device 20 on the transmitting side may previously acquire the bandwidth before receiving the document data.

Then, the terminal device 20 on the transmitting side assigns a transmission rate to each of the video data, the audio data, and the document data that are to be transmitted on the basis of the network bandwidth on the transmitting side (Step S15). Next, the terminal device 20 on the transmitting side extracts the set values (the resolution, the frame rate, and the color depth) of the qualities from the table on the basis of the transmission rate that is assigned to the document data (Step S16).

Then, the terminal device 20 on the transmitting side compares the value of the quality of the document data, which is detected at Step S13, with the set value of the quality that is extracted from the table, thereby determining the quality that needs to be converted (Step S17). Specifically, if the value of the quality of the input document data is larger than the set value of the quality that is extracted from the table, the terminal device 20 on the transmitting side determines that the quality is a quality that needs to be converted.

Next, the terminal device 20 on the transmitting side converts the document data, which is input from the computer 110, into the set value that is extracted from the table with regard to the quality that is determined to be converted (Step S18). Next, the terminal device 20 on the transmitting side encodes each of the video data, the audio data, and the document data whose quality has been converted by using the transmission rate that is assigned at Step S15 (Step S19). Then, the terminal device 20 on the transmitting side transmits, to the relay device 40, the video data, the audio data, and the document data that are encoded (Steps S20 and S21).

Next, the relay device 40 forwards the video data, the audio data, and the document data, which are received from the terminal device 20 on the transmitting side, to the terminal device 20 on the receiving side (Step S22).

Then, the terminal device 20 on the receiving side receives the video data, the audio data, and the document data that are encoded and are transmitted from the relay device 40 (Step S23). Then, the terminal device 20 on the receiving side decodes the video data, the audio data, and the document data that are received (Step S24). Then, the terminal device 20 on the receiving side outputs the video data, the audio data, and the document data that are decoded (Step S25).

In the above-described transmission system 10, before the document data is encoded, it is previously degraded so as to have the quality (that is, the quality such that at least information can be understood) that corresponds to the transmission rate that is assigned to the document data. Thus, with the transmission system 10, document data can be prevented from being compressed at a too high compression rate during encoding, the resolution and the frame rate can be prevented from being extremely decreased and, when the document data is decoded by the terminal device 20 on the receiving side, the contents of information can be understood.

Second Embodiment

Next, an explanation is given of the transmission system 10 according to a second embodiment of the present invention. Here, the transmission system 10 according to the second embodiment is substantially the same as the transmission system 10 according to the first embodiment; therefore, the same reference numeral is applied to the component that has substantially the same functionality, detailed explanations are omitted, and the difference is primarily explained.

Figure 14:
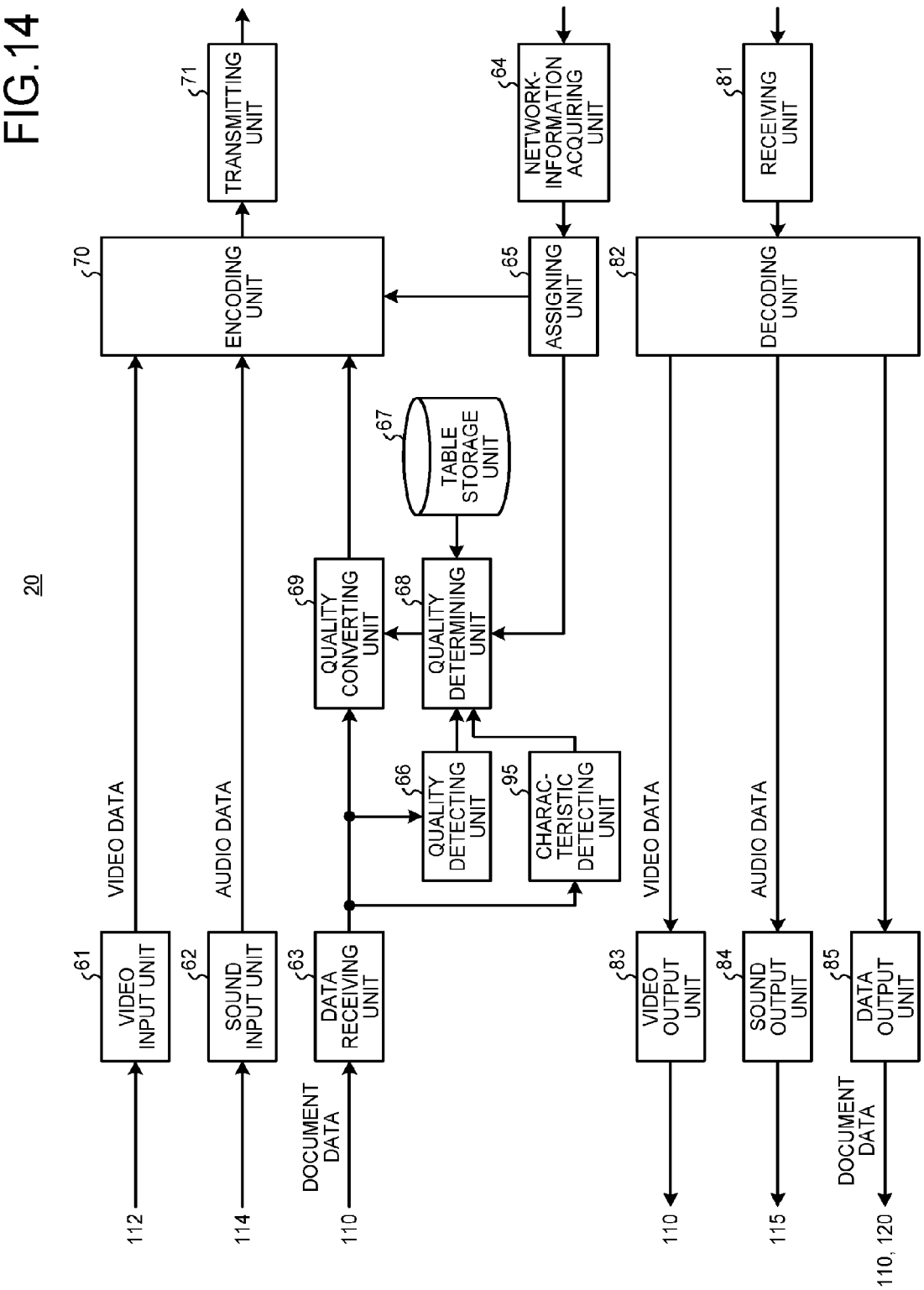
FIG. 14 is a diagram that illustrates the functional configuration of the terminal device according to a second embodiment of the present invention.

FIG. 14 is a diagram that illustrates the functional configuration of the terminal device 20 according to the second embodiment. The terminal device 20 according to the second embodiment further includes a characteristic detecting unit 95.

The characteristic detecting unit 95 detects the characteristics of the document data that is received by the data receiving unit 63 from the computer 110. According to the present embodiment, the characteristic detecting unit 95 detects whether the document data, which is input from the computer 110, is a moving image or a still image (the type). Furthermore, the characteristic detecting unit 95 detects whether the image of the document data, which is input from the computer 110, includes a character or not.

Furthermore, according to the present embodiment, with respect to each of the characteristics, the table storage unit 67 stores the table that stores the set value of the parameter of the quality with regard to each transmission rate range. According to the present embodiment, the table storage unit 67 stores the table in the case of a moving image with a character included, the table in the case of a moving image with no character included, the table in the case of a still image with a character included, and the table in the case of a still image with no character included.

Furthermore, according to the present embodiment, the quality determining unit 68 determines the quality of the document data on the basis of the document data characteristics (whether it is a moving image or a still image and whether a character is included or not) and the transmission rate that is assigned to the document data. More specifically, the quality determining unit 68 selects the corresponding table from the table storage unit 67 on the basis of the characteristic that is detected by the characteristic detecting unit 95. Then, the quality determining unit 68 extracts, from the selected table, the resolution, the frame rate, and the color depth that correspond to the transmission rate that is assigned to the document data and determines the resolution, the frame rate, and the color depth during transmission of the document data.

Figure 15:
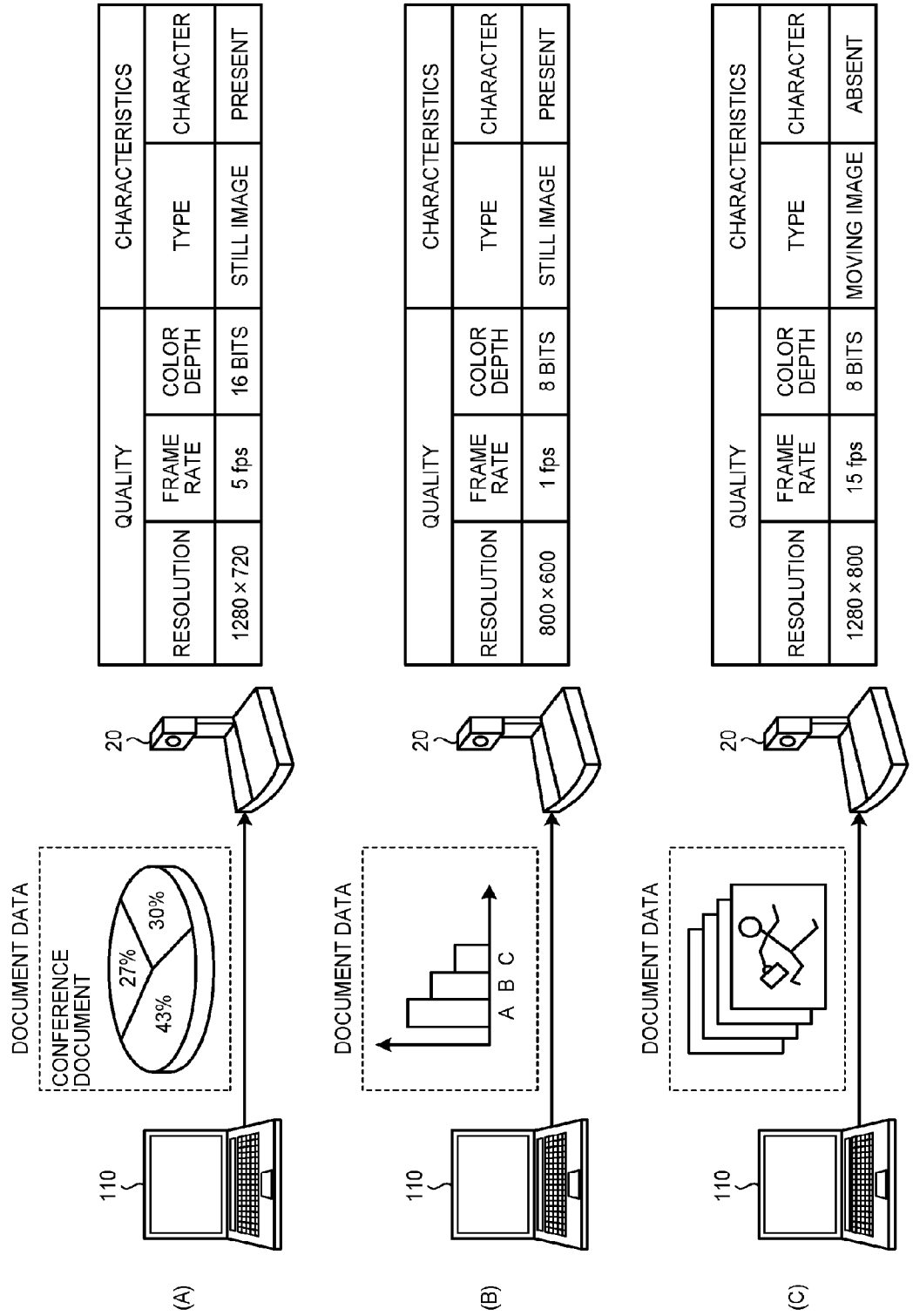
FIG. 15 is a diagram that illustrates an example of a detection result of the quality and the characteristics of document data.

FIG. 15 is a diagram that illustrates an example of a detection result of the quality and the characteristics of document data. The quality detecting unit 66 detects the quality of the document data that is input from the computer 110. Also, the characteristic detecting unit 95 detects the characteristics of the document data that is input from the computer 110.

In the example of (A) of FIG. 15, the quality detecting unit 66 detects that the input document data has a resolution of 1280×720 dots, a frame rate of 5 fps, and a color depth of 16 bits. Furthermore, the characteristic detecting unit 95 detects that the type of the input document data is a still image and a character is included (present).

In the example of (B) of FIG. 15, the quality detecting unit 66 detects that the input document data has a resolution of 800×600 dots, a frame rate of 1 fps, and a color depth of 8 bits. Furthermore, the characteristic detecting unit 95 detects that the type of the input document data is a still image and a character is included (present).

In the example of (C) of FIG. 15, the quality detecting unit 66 detects that the input document data has a resolution of 1280×800 dots, a frame rate of 15 fps, and a color depth of 8 bits. Furthermore, the characteristic detecting unit 95 detects that the type of the input document data is a moving image and any character is not included (absent). Moreover, the characteristic detecting unit 95 may detect a different characteristic of document data.

Figure 16:
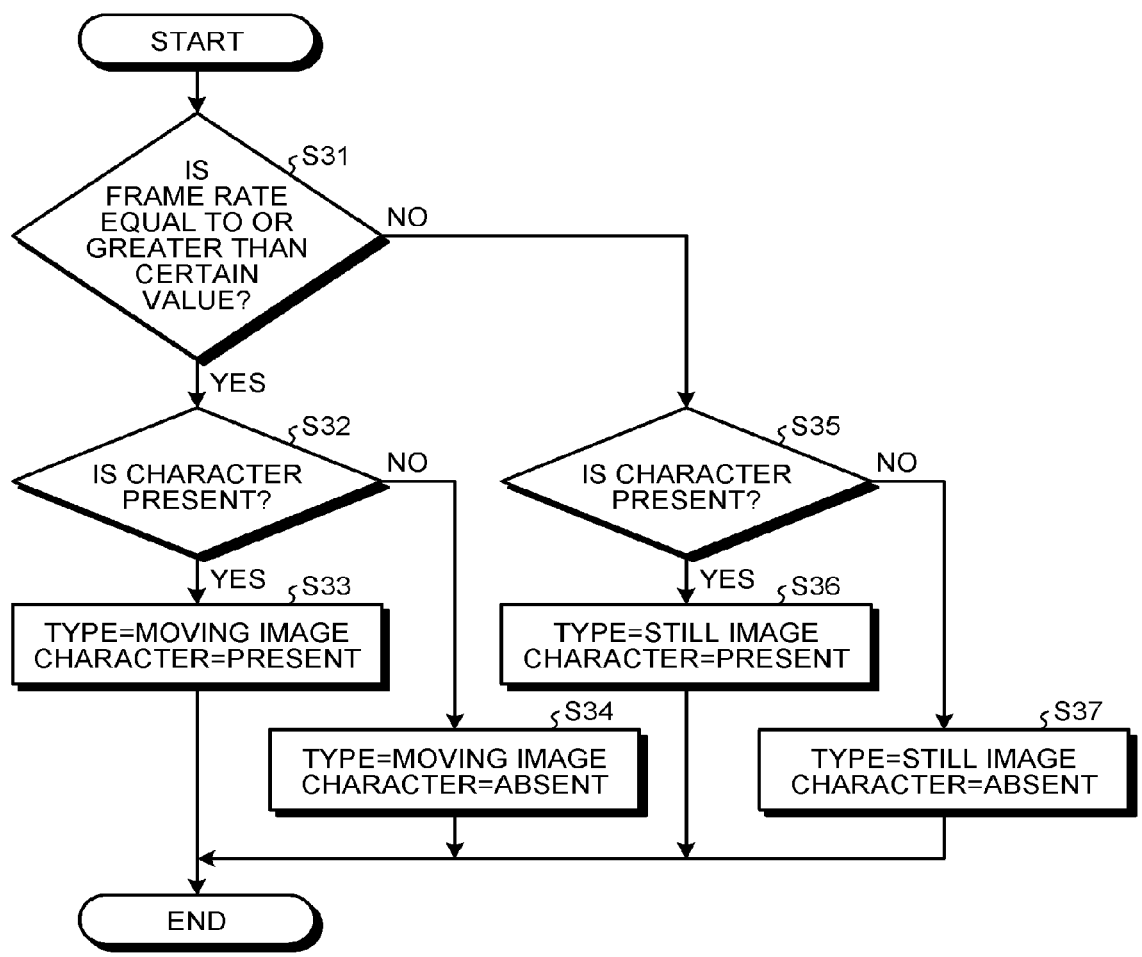
FIG. 16 is a flowchart that illustrates the method for determining the characteristics of document data.

FIG. 16 is a flowchart that illustrates the method for determining the characteristics of document data. For example, the characteristic detecting unit 95 detects the characteristics of document data during the operation that is illustrated at Step S31 to Step S37 of FIG. 16.

First, the characteristic detecting unit 95 determines whether the frame rate is equal to or greater than a certain value (Step S31). For example, the characteristic detecting unit 95 determines whether the frame rate is equal to or greater than 15 fps.

If the frame rate is equal to or greater than the certain value (Yes at Step S31), the characteristic detecting unit 95 determines whether the image includes a character (Step S32). For example, the characteristic detecting unit 95 performs a character recognition operation, or the like, on the image, thereby determining whether a character can be detected. If the frame rate is equal to or greater than the certain value and if the image includes a character (Yes at Step S32), the characteristic detecting unit 95 determines that the type of the input document data is a moving image and that a character is included (present) (Step S33). Alternatively, if the frame rate is equal to or greater than the certain value and if the image does not include any character (No at Step S32), the characteristic detecting unit 95 determines that the type of the input document data is a moving image and that any character is not included (absent) (Step S34).

Conversely, if the frame rate is not equal to or greater than the certain value (No at Step S31), the characteristic detecting unit 95 determines whether the image includes any character (Step S35). If the frame rate is not equal to or greater than the certain value and if the image includes a character (Yes at Step S35), the characteristic detecting unit 95 determines that the type of the input document data is a still image and that a character is included (present) (Step S36). Furthermore, if the frame rate is not equal to or greater than the certain value and if the image does not include any character (No at Step S35), the characteristic detecting unit 95 determines that the type of the input document data is a moving image and that any character is not included (absent) (Step S37).

Then, after the characteristic detecting unit 95 completes the operation at Step S33, Step S34, Step S36, or Step S37, this flow is terminated.

FIG. 17 is a diagram that illustrates an example of the table that stores the set values of the resolution, the frame rate, and the color depth according to the second embodiment.

According to the second embodiment, as illustrated in FIG. 17, the table storage unit 67 stores the table in the case of a moving image with a character included, the table in the case of a moving image with no character included, the table in the case of a still image with a character included, and the table in the case of a still image with no character included. Each of the tables stores the set values of the resolution, the frame rate, and the color depth with regard to each transmission rate range.

Furthermore, each of the tables stores a different set value depending on whether the document data is a moving image or a still image and whether a character is included or not.

For example, with regard to the same transmission rate, the set value of the frame rate in the table in a case where the document data is a moving image is equal to or higher than that in the table in a case where the document data is a still image. Furthermore, for example, with regard to the same transmission rate, the set value of the resolution in the table in a case where the document data is a still image is equal to or higher than that in the table in a case where the document data is a moving image.

Furthermore, for example, with regard to the same transmission rate, the set value of the resolution in the table in a case where the document data includes a character is equal to or higher than that in the table in a case where the document data does not include any character. Moreover, for example, with regard to the same transmission rate, the set value of the frame rate in the table in a case where the document data does not include any character is equal to or higher than that in the table in a case where the document data includes a character.

The transmission system 10 according to the second embodiment adjusts the qualities in accordance with the characteristics (whether it is a moving image or a still image or whether a character is included or not) of the document data as described above. Thus, the transmission system 10 is capable of previously degrading the quality in accordance with the characteristics of document data such that the contents of information can be understood. Therefore, with the transmission system 10 according to the second embodiment, if document data is decoded by the terminal device 20 on the receiving side, the contents of information can be understood more definitely.

According to the embodiments of the present invention, it is possible to prevent extreme encoding such that information cannot be understood when document data is decoded by the receiving side.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. A terminal device in a transmission system including a plurality of terminal devices, the transmission system configured such that, to cause multiple users who use the plurality of terminal devices to perform a communication, multiple sets of data are encoded, transmitted, and received via a network between the plurality of terminal devices, the terminal device comprising:
  a data receiving circuit that receives document data from an external device;
  a network-information acquiring circuit that acquires a network bandwidth that is available to transmit data;
  an assigning circuit that assigns a transmission rate to each set of data that is to be transmitted to different terminal devices of the plurality of terminal devices in accordance with the network bandwidth that is available to transmit data;
  a table storage circuit that stores a table that stores set values of a resolution, a frame rate, and a color depth corresponding to ranges of transmission rates;
  a quality determining circuit that determines a threshold quality of the document data, that is transmitted from the terminal device to the different terminal devices and is in accordance with the transmission rate that is assigned to the document data, the threshold quality of the document data including at least one of a resolution, a frame rate and a color depth, by
    extracting, from the table storage circuit, set values of a resolution, a frame rate, and a color depth that are stored and related to the transmission rate that is assigned to the document data, and
    determining, as the threshold quality of the document data, a parameter that has a higher quality than the document data based on extracted set values of the resolution, the frame rate, and the color depth;
  a quality converting circuit that converts the document data received from the external device such that a quality of the document data is equal to or less than the determined threshold quality;
  an encoding circuit that encodes multiple sets of data that include the converted document data by using transmission rates that are assigned to the sets of data; and
  a transmitting circuit that transmits multiple sets of encoded data to the different terminal devices, wherein
  the document data is image data that is displayed on a screen by a computer as a result of a program execution.

2. The terminal device according to claim 1, wherein the encoding circuit is further configured to
  generate video data by capturing an object,
  generate audio data by collecting a sound, and
  encode each of the video data, the audio data, and the document data by using the transmission rate that is assigned to each set of data.

3. The terminal device according to claim 1, wherein a set value of each parameter that is stored in the table is a value where, when the document data is encoded by using a corresponding transmission rate and is then decoded, a degradation of an image falls within an acceptable range.

4. The terminal device according to claim 1, wherein the quality determining circuit further determines the threshold quality of the document data in accordance with a characteristic of the document data and a transmission rate that is assigned to the document data.

5. The terminal device according to claim 4, wherein the quality determining circuit determines the threshold quality of the document data based on whether the document data is a moving image or a still image.

6. The terminal device according to claim 4, wherein the quality determining circuit determines the threshold quality of the document data based on whether the document data includes a character or not.

7. A data transmission method that is implemented by a terminal device in a transmission system including a plurality of terminal devices, the transmission system configured such that, to cause multiple users who use the plurality of terminal devices to perform a communication, multiple sets of data are encoded, transmitted, and received via a network between the plurality of terminal devices, the data transmission method comprising:
receiving document data from an external device;
acquiring a network bandwidth that is available to transmit data;
assigning a transmission rate to each set of data that is to be transmitted to different terminal devices of the plurality of terminal devices in accordance with the network bandwidth that is available to transmit data;
storing a table that stores set values of a resolution, a frame rate, and a color depth corresponding to ranges of transmission rates;
determining a threshold quality of the document data, that is transmitted from the terminal device to the different terminal devices and is in accordance with the transmission rate that is assigned to the document data, the threshold quality of the document data including at least one of a resolution, a frame rate and a color depth, by
extracting, from the table set values of a resolution, a frame rate, and a color depth that are stored and related to the transmission rate that is assigned to the document data, and
determining, as the threshold quality of the document data, a parameter that has a higher quality than the document data based on extracted set values of the resolution, the frame rate, and the color depth;
converting the document data received from the external device such that a quality of the document data is equal to or less than the determined threshold quality;
encoding multiple sets of data that include the converted document data by using transmission rates that are assigned to the sets of data; and
transmitting multiple sets of encoded data to the different terminal devices, wherein
the document data is image data that is displayed on a screen by a computer as a result of a program execution.

8. The data transmission method according to claim 7, wherein in the encoding, video data is generated by capturing an object, audio data is generated by collecting a sound, and each of the video data, the audio data, and the document data are encoded by using the transmission rate that is assigned to each set of data.

9. The data transmission method according to claim 7, wherein a set value of each parameter that is stored in the table is a value where, when the document data is encoded by using a corresponding transmission rate and is then decoded, a degradation of an image falls within an acceptable range.

10. The data transmission method according to claim 7, wherein in the quality determining, further determining the threshold quality of the document data in accordance with a characteristic of the document data and a transmission rate that is assigned to the document data.

11. The data transmission method according to claim 10, wherein in the quality determining, the threshold quality of the document data is determined based on whether the document data is a moving image or a still image.

12. The data transmission method according to claim 10, wherein in the quality determining, the threshold quality of the document data is determined based on whether the document data includes a character or not.

13. A non-transitory computer-readable recording medium storing computer readable program codes when, when performed by a terminal device in a transmission system including a plurality of terminal devices, the transmission system configured such that, to cause multiple users who use the plurality of terminal devices to perform a communication, multiple sets of data are encoded, transmitted, and received via a network between the plurality of terminal devices, the terminal device is caused to:
receive document data from an external device;
acquire a network bandwidth that is available to transmit data;
assign a transmission rate to each set of data that is to be transmitted to different terminal devices of the plurality of terminal devices in accordance with the network bandwidth that is available to transmit data;
store a table that stores set values of a resolution, a frame rate, and a color depth corresponding to ranges of transmission rates;
determine a threshold quality of the document data, that is transmitted from the terminal device to different terminal devices and is in accordance with the transmission rate that is assigned to the document data, the threshold quality of the document data including at least one of a resolution, a frame rate and a color depth, by
extracting, from the table set values of a resolution, a frame rate, and a color depth that are stored and related to the transmission rate that is assigned to the document data, and
determining, as the threshold quality of the document data, a parameter that has a higher quality than the document data based on extracted set values of the resolution, the frame rate, and the color depth;
convert the document data received from the external device such that a quality of the document data is equal to or less than the determined threshold quality;
encode multiple sets of data that include the converted document data by using transmission rates that are assigned to the sets of data; and
transmit multiple sets of encoded data to the different terminal devices, wherein
the document data is image data that is displayed on a screen by a computer as a result of a program execution.

* * * * *